Sept. 13, 1932.   E. C. HEAD   1,877,173

METHOD OF CUTTING GEARS

Original Filed May 16, 1928   2 Sheets-Sheet 1

INVENTOR
Ernest C. Head
BY
B. F. Schlesinger
his ATTORNEY

Sept. 13, 1932.  E. C. HEAD  1,877,173
METHOD OF CUTTING GEARS
Original Filed May 16, 1928  2 Sheets-Sheet 2

INVENTOR
Ernest C. Head
BY
[signature]
his ATTORNEY

Patented Sept. 13, 1932

1,877,173

UNITED STATES PATENT OFFICE

ERNEST C. HEAD, OF ROCHESTER, NEW YORK, ASSIGNOR TO GLEASON WORKS, OF ROCHESTER, NEW YORK, A CORPORATION OF NEW YORK

METHOD OF CUTTING GEARS

Original application filed May 16, 1928, Serial No. 278,209, and in Great Britain April 29, 1929. Divided and this application filed April 24, 1930. Serial No. 447,010.

The present invention relates to a method of cutting longitudinally curved tooth tapered gears and particularly to a method of hobbing such gears.

This application is a division of my pending application Serial No. 278,209, filed May 16, 1928 which covers the gears produced by the process herein described and claimed.

The primary purpose of the new method is to enable longitudinally curved tooth tapered gears to be cut in a hobbing operation with teeth of increased strength as compared with previous forms of hobbed tapered gears.

A further purpose of the invention is to provide a method for hobbing longitudinally curved tooth tapered gears so that the teeth are of tapering depth, free of "bias bearing" and of proper proportions corresponding to their taper.

Other objects of the invention will be apparent hereinafter from the specification and the recital of the appended claims.

Heretofore it has been customary in hobbing tapered gears to cut both members of a pair "parallel depth", that is, with teeth of uniform depth from end to end. Tapered gears which are of "parallel depth" are, however, weak at their inner or small ends because, for one reason, at their small ends, the teeth are of excessive height in proportion to their thickness. To avoid the disadvantages of the "parallel depth" form of tooth, it has also been proposed to hob tapered gears "tapering depth", that is, so that their teeth decrease in depth from their large to their small ends, but the only way heretofore suggested for cutting this form of tooth has been to turn off the teeth of the hob in such wise that they decrease in height from the large to the small end of the hob. Where only this is done, however, the teeth cut on the gear are not properly proportioned from end to end. Regardless of the type of hob used, then, gears hobbed according to previous practice have not been as strong or as capable of bearing heavy loads as tapered gears cut by methods other than a hobbing process.

With the present invention, however, a hobbing method is provided which enables gears of tapering tooth depth to be cut with the teeth tapering in thickness from one end to the other in proper proportion to their taper in depth. The result is that tapered gears can be hobbed with the present invention which have teeth that are proportionately as strong at their inner as at their outer ends and hence, with the present invention, tapered gears can be hobbed which are comparable in strength to tapered gears cut by other than hobbing processes.

Figure 1:
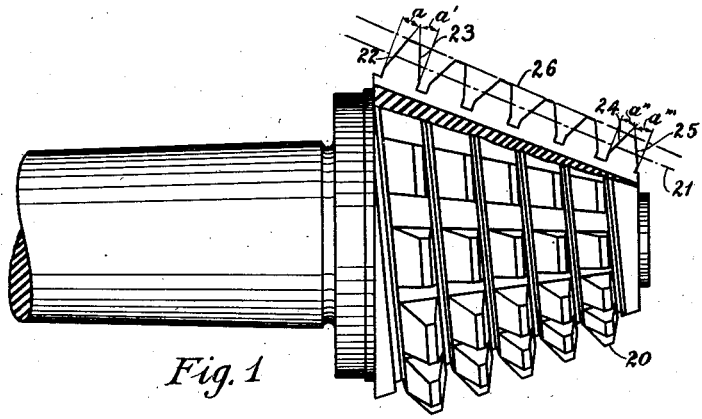
Figure 1 is a side elevation, partly in section, of a taper hob such as is preferably employed in hobbing gears according to this invention.

In hobbing gears by the method of this invention, the hob employed is constructed preferably in the manner described in my co-pending application, Serial No. 278,208 filed May 16, 1928. Such a hob is shown in Figure 1 and designated by the numeral 20. The hob shown is of constant pitch in axial section measured on the pitch surface 21 of the hob, though it is to be understood that the hob may be of changing lead, or of constant pitch in other than an axial plane, and so forth. The cutting edges of the hob are of changing pressure angle from one end of the hob to the other, being preferably of continuously increasing pressure angle from the large to the small end of the hob. Thus, the pressure angle $a$ of the cutting edge 22 of the hob is less than the pressure angle $a'$ of the cutting edge 23 of the hob and, in turn, the pressure angles of successive cutting edges increase continuously from the large to the small end of the hob, the pressure angle $a''$ of the cutting edge 24 being greater than the pressure angle of the cutting edge 22 but less than the pressure angle $a'''$ of the cutting edge 25. In order to cut teeth of tapering depth, the cutting teeth of the hob are made to decrease in height from the small end of the hob. This can be accomplished by turning off the top cone surface 26 of the hob to a smaller cone angle than the pitch cone surface 21.

Figures 2, 3:
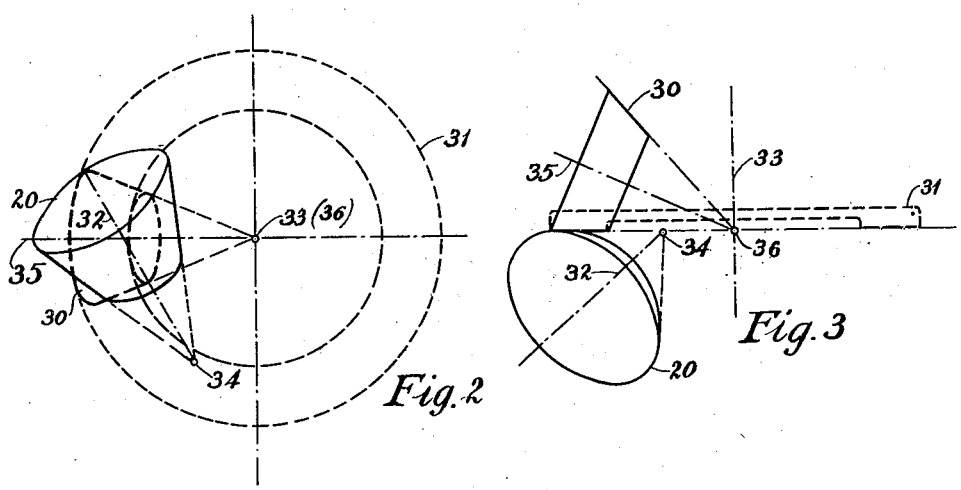
Figures 2 and 3 are a plan view and a side elevation, respectively, illustrating diagrammatically the preferred method of producing gears according to this invention.

In hobbing gears according to this invention, the hob is positioned so that it extends diagonally of the face of the teeth of the blank with the large end of the hob cutting at the outside of the toothed portion of the blank and the small end of the hob cutting at the inside of the toothed portion thereof. Figures 2 and 3 illustrate one method of generating gears with the hobbing process of this invention. 30 designates the blank to be cut, in this case, a pinion blank. The hob 20 is so positioned relative to the blank 30 as to represent a crown gear or other basic gear 31. Thus, the hob and gear blank are brought into tangential relation with the axis 32 of the hob offset from the axis 33 of the imaginary basic crown gear and extending diagonally of the face of this basic crown gear. The hob may be positioned so that its apex 34 lies on a line perpendicular to the axes 32 and 35, respectively, of the hob and gear blank, if it is desired to hob gears generally according to the process described in the patent to Nikola Trbojevich, Reissue No. 16,173, of September 22, 1925, or the hob may be adjusted with reference to the blank so that its apex 34 is offset from such a perpendicular line. The latter setting is illustrated in the drawings of the present application. If the gear to be cut is a bevel gear, the blank is preferably positioned so that the axis 35 intersects the axis 33 of the crown gear in the blank apex 36.

In generating the gear, the hob 20 and the blank 30 are rotated continuously on their respective axes 32 and 35 in timed relation and simultaneously a continuous relative rolling movement is imparted between the hob and the blank about the axis 33 of the basic generating gear 31. The teeth of the blank are completely generated after the hob has rolled once across the blank. The other member of the pair can be generated in the same way with a hob of opposite hand.

It is to be noted that with the hob positioned diagonally of the face of the blank, the cutting teeth of the hob which are of smaller pressure angle will operate upon the outer ends of the teeth of the blank while the cutting teeth of the hob which are of larger pressure angle will operate at the inner ends of the teeth of the blank.

Due to the construction of the hob and the manner in which it is positioned relative to the blank, the pressure angles of the teeth of the gear will vary in any section normal to the teeth, but they will be of uniform pressure angle from end to end measured circumferentially of the gear. These features are in contrast with taper gears hobbed according to prior practice, for in the prior practice, the hobs employed have been of constant pressure angle from one end to the other with the result that the teeth cut on the gear have been of constant pressure angle in sections normal to the teeth and of varying pressure angle from end to end measured circumferentially of the gear. With teeth cut "parallel depth", gears hobbed by prior processes have angles measured circumferentially often varying from the large to the small end of the tooth as much as six or eight degrees, decreasing toward the small ends of the teeth. Thus, with the teeth at the small end the same height as at the large end and of less pressure angle at the small end than at the large end and with a tendency toward undercut or decrease of the tooth thickness below the base circle of the gear, the teeth have been always much weaker at their small ends than at their large ends. By keeping the circumferential pressure angle constant, however, as is possible with the present invention, the teeth at their small ends are comparatively as strong as at their large ends and with teeth cut "tapering depth", the tooth strength at all points along the length of the teeth is proportionate to the natural taper of the teeth and gears will be produced which are of greater strength than were possible of production with any previous hobbing process.

Figure 4:
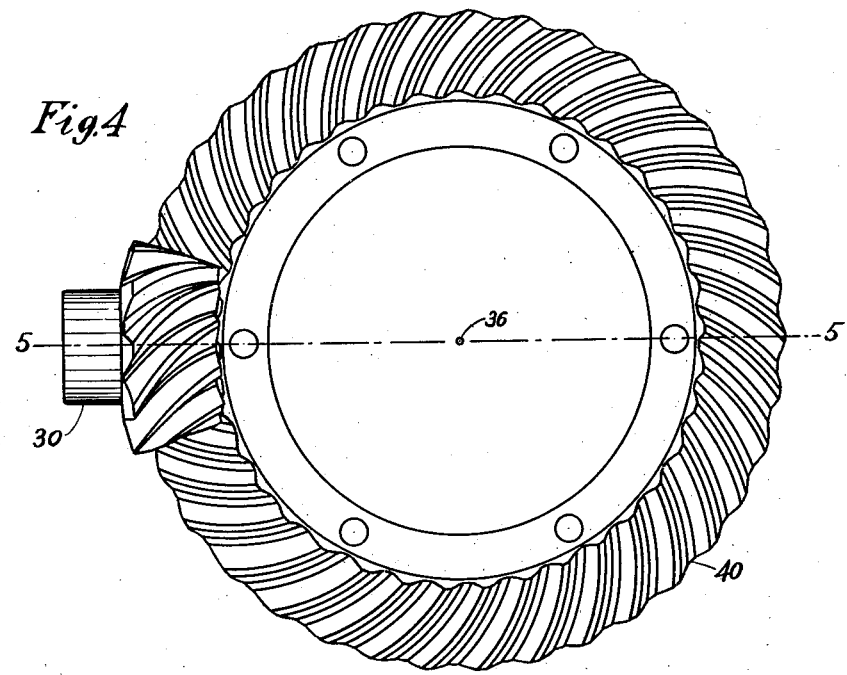
Figure 4 is a plan view of a pair of spiral bevel gears such as might be produced by this invention.
Figure 5:
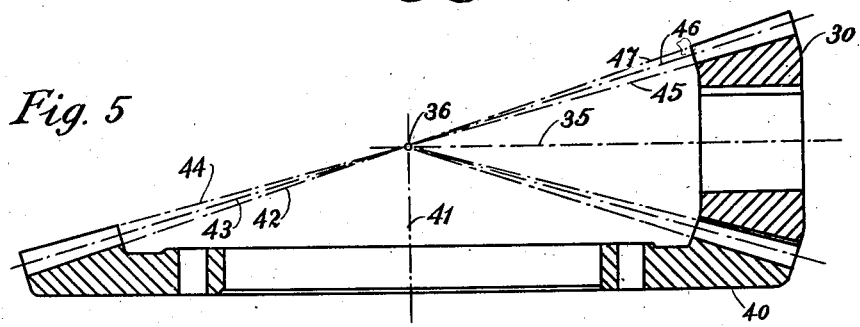
Figure 5 is a sectional view of these gears, the section being taken on the line 5—5 of Figure 4.

A pair of gears such as might be cut according to this invention are shown in Figures 4 and 5. 30 again designates the pinion and the gear is designated at 40. The teeth of both members are curved longitudinally. The axes 35 and 41, respectively, of the gear and pinion intersect in a common apex 36. 42 designates the root cone surface of the gear, 43 its pitch cone surface and 44 its top cone surface. 45 designates the root cone surface of the pinion, 46 its pitch cone surface and 47 its top cone surface. The teeth of the gear taper in height from end to end, decreasing in height from their outer to their inner ends. It is possible to proportion the gears of a pair by cutting them according to this invention so that the root, pitch and top cone surfaces of both members intersect in a common apex 36, as shown. Hence, with the present invention it is possible to cut longitudinally curved teeth tapered gears having teeth which taper in depth from end to end in proportion to the taper of the gears themselves, corresponding in this respect to straight bevel gears.

Figure 6:
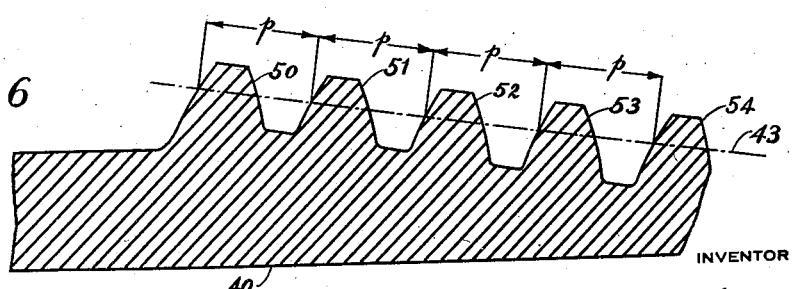
Figure 6 is a section on an enlarged scale through the gear or larger member of the pair, the section being taken along a line offset from the axis of the gear and extending diagonally of the face of the gear.

Figure 6 shows a section through a gear cut according to this invention with a hob such as shown in Figure 1. This section may be considered taken along a line coinciding with the projected hob axis, which is a line offset from the axis 41 of the gear and extending diagonally of the face of the gear. In this section, the teeth of the gear are of uniform pitch measured on the pitch surface of the gear, the distances $p$ measured on the pitch surface 43 of the gear being equal. In this section, however, the pressure angles of the teeth of the gear will, of course, vary, the pressure angles of the sides of tooth 50 being, for instance, greater than the pressure angles of the teeth 51, 52, 53 and 54, the pressure angles of the sides of these teeth changing from end to end in this section in accordance with the change in pressure angle of the teeth of the hob.

Figures 7, 8:
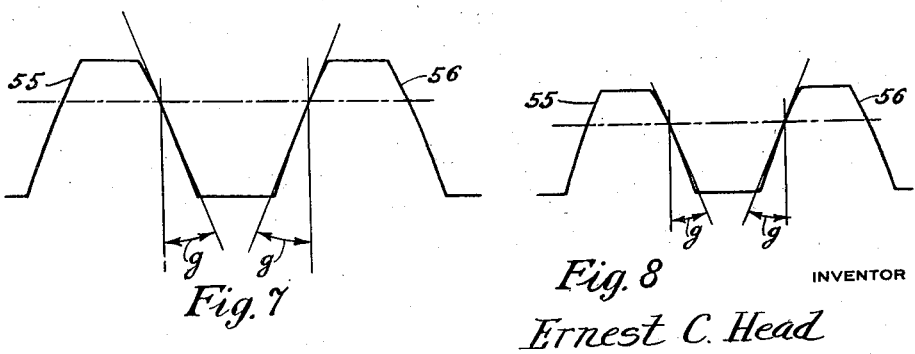
Figure 7 is an end elevation of a pair of teeth of the gear, looking at the large ends of the teeth.
Figure 8 is a similar view looking at the small ends of the teeth.

End elevations of the large and small ends of two teeth 55 and 56 are shown diagrammatically in Figures 7 and 8, respectively. The pressure angle $g$ of the sides of the gear teeth are substantially the same from the large to the small ends of the teeth measured in the circumferential direction and the same for opposite sides of the teeth, as indicated. In this respect, curved tooth gears cut according to the present invention further resemble straight tooth bevel gears. The taper in height of the teeth from the large to the small end is clearly illustrated in these figures, also. The same characteristic construction is to be found in the pinion which has, also, teeth tapering in height from their large to their small ends and of constant pressure angle measured circumferentially of the gear, with the pressure angles of opposite side faces of the teeth being equal measured in the circumferential direction. The teeth of both the gear and pinion are, therefore, symmetrical. From Figures 6, 7, and 8, it will be clear that with the present invention it is possible to cut longitudinally curved tooth tapered gears of increased strength since the teeth at their small ends are much stronger than are the teeth of longitudinally curved tooth gears hobbed according to any previous process.

While the method of the present invention has been described in connection with the generation of gears according to a rolling process, it will be understood that the features of the present invention may be employed, as well, in the hobbing of tapered gears without roll. In a further aspect, the invention is not limited to the hobbing of gears, as the principles of the invention may be employed even where, for instance, the tool is not a hob but a milling cutter having its cutting teeth arranged in a plurality of circumferential series of teeth.

Where the term "tapered gear" is used in the specification and claims, it is intended to include bevel and hypoid gears and crown gears, also, for the last named gears are tapered gears of ninety degree pitch cone angle.

In general, it may be said that while I have described my invention in connection with a particular embodiment and a specific use, it will be understood that the invention is capable of various further modifications without departing from its scope and that this application is intended to cover any adaptations, uses, or embodiments of the invention, following in general, the principles of the invention and including such departures from the present disclosure as come within known or customary practice in the gear art and as may be applied to the essential features hereinbefore set forth and as fall within the scope of the invention or the limits of the appended claims.

Having thus described my invention, what I claim is:

1. The method of cutting a tapered gear which comprises positioning a hob, having a plurality of helically arranged cutting teeth, the side cutting edges of which are of continuously varying pressure angle from one end of the hob to the other, so that said hob extends diagonally of the face of the blank and rotating the hob and blank continuously in engagement while simultaneously producing a relative rolling motion between the hob and blank.

2. The method of cutting a tapered gear which comprises positioning a taper hob, having a plurality of helically arranged cutting teeth, the side cutting edges of which are of continuously varying pressure angle from one end of the hob to the other, so that said hob extends diagonally of the face of the blank and rotating the hob and blank continuously in engagement while simultaneously producing a relative rolling motion between the hob and blank.

3. The method of cutting a tapered gear which comprises positioning a hob, having a plurality of helically arranged cutting teeth, the side cutting edges of which are of continuously varying pressure angle from one end of the hob to the other, so that said hob extends diagonally of the face of the blank and rotating the hob and blank continuously in engagement.

4. The method of cutting a tapered gear which comprises positioning a taper hob, having a plurality of helically arranged cutting teeth, the side cutting edges of which are of continuously increasing pressure angle from the large to the small end of the hob, so that said hob extends diagonally of the face of the blank and rotating the hob and blank continuously in engagement.

5. The method of cutting a tapered gear which comprises positioning a hob, having a plurality of helically arranged cutting teeth which increase in height from one end of the hob to the other and the side cutting edges of which are of continuously varying pressure angle from one end of the hob to the other, so that said hob extends diagonally of the face of the blank and rotating the hob and blank continuously in engagement.

6. The method of cutting a tapered gear which comprises positioning a taper hob, having a plurality of helically arranged cutting teeth which decrease in height from the large to the small end of the hob, the side cutting edges of which are of continuously increasing pressure angle from the large to the small end of the hob, so that said hob extends diagonally of the face of the gear blank with the large end of the hob cutting at the outside of the toothed portion of the blank and the small end of the hob cutting at the inside of the toothed portion of the blank, and rotating the hob and blank continuously in engagement.

7. The method of cutting a tapered gear which comprises positioning a hob, having a plurality of helically arranged cutting teeth, the side cutting edges of which are of continuously increasing pressure angle from one end of the hob to the other, so that said hob extends diagonally of the face of the blank with the cutting edges of smaller pressure angle operating at the outside of the toothed portion of the blank and the cutting edges of larger pressure angle operating at the inside of the toothed portion of the blank, and rotating the hob and blank continuously in engagement.

8. The method of cutting a tapered gear which comprises positioning a cutting tool, having cutting edges of continuously varying pressure angle from one end of the tool to the other, so that said tool extends diagonally of the face of the blank and rotating the tool in engagement with the blank while simultaneously producing a relative rolling motion between the tool and blank.

9. The method of cutting a tapered gear which comprises positioning a cutting tool, having cutting teeth decreasing in height from one end of the tool to the other and having cutting edges, the pressure angle of which is constantly varying from one end of the tool to the other in such wise that as the height of the teeth of the tool decrease, the pressure angles increase, so that the axis of said tool extends diagonally of the face of the blank with the cutting edges of smaller pressure angle operating at the outside of the toothed portion of the blank and the cutting edges of larger pressure angle operating at the inside of the toothed portion of the blank, and rotating the tool and blank in engagement while simultaneously producing a relative rolling motion between the tool and blank.

10. The method of cutting a tapered gear which comprises positioning a tool, having cutting edges of constantly increasing pressure angles from one end of the tool to the other, so that the axis of said tool extends diagonally of the face of the blank with the cutting edges of larger pressure angle operating at the inside edge of the toothed portion of the blank and the cutting edges of smaller pressure angle operating at the outside of the toothed portion of the blank, and rotating the tool and blank in engagement while simultaneously producing a relative rolling motion between the tool and blank.

11. The method of cutting a tapered gear which comprises positioning a hob, having a plurality of side cutting edges arranged in a thread which is of constant pitch measured on the pitch surface of the hob, and having corresponding side cutting edges of its teeth of continuously varying pressure angle from one end of the hob to the other, so that said hob extends diagonally of the face of the tapered gear blank, and rotating the hob and blank continuously in engagement.

12. The method of cutting a tapered gear which comprises positioning a taper hob, having a plurality of side cutting edges arranged in a thread which is of constant pitch measured on a cone surface of the hob, and having corresponding side cutting edges of continuously increasing pressure angle from the large to the small end of the hob, so that said hob extends diagonally of the face of the blank with the cutting edges of smaller pressure angle operating at the outside of the toothed portion of the blank and the cutting edges of larger pressure angle operating at the inside of the toothed portion of the blank, and rotating the hob and blank continuously in engagement.

13. The method of cutting a tapered gear which comprises positioning a taper hob, having a plurality of side cutting edges arranged in a thread which in an axial plane is of constant pitch measured on a cone surface of the hob, and having corresponding side cutting edges of continuously increasing pressure angle from the large to the small end of the hob, so that said hob extends diagonally of the face of a tapered gear blank with the cutting edges of smaller pressure angle operating at the outside of the toothed portion of the blank and the cutting edges of larger pressure angle operating at the inside of the toothed portion of the blank, and rotating the hob and blank continuously in engagement.

14. The method of cutting a tapered gear which comprises positioning a taper hob, having a plurality of helically arranged cutting teeth which increase in height from the small to the large end of the hob and which are arranged in a thread which in an axial plane is of constant pitch measured on the pitch surface of the hob, said teeth having side cutting edges which are of continuously increasing pressure angle from the large to the small end of the hob, so that said hob extends diagonally of the face of a tapered gear blank with the cutting edges of smaller pressure angle operating at the outside of the toothed portion of the blank and the cutting edge of larger pressure angle operating at the inside of the toothed portion of the blank, and rotating the hob and blank continuously in engagement.

15. The method of cutting tapered gears which comprises positioning a hob, having a plurality of side cutting edges arranged in a thread which is of constant pitch measured on the pitch surface of the hob, and having corresponding side cutting edges of its teeth of continuously varying pressure angle from one end of the hob to the other, so that said hob extends diagonally of the face of the tapered gear blank, and rotating the hob and blank continuously in engagement while simultaneously producing a relative rolling motion between the hob and blank.

16. The method of cutting a tapered gear which comprises positioning a taper hob, having a plurality of side cutting edges arranged in a thread which is of constant pitch measured on a cone surface of the hob, and having corresponding side cutting edges of continuously increasing pressure angle from the large to the small end of the hob, so that said hob extends diagonally of the face of the blank with the cutting edges of smaller pressure angle operating at the outside of the toothed portion of the blank and the cutting edges of larger pressure angle operating at the inside of the toothed portion of the blank, and rotating the hob and blank continuously in engagement while simultaneously producing a relative rolling motion between the hob and blank.

17. The method of cutting a tapered gear which comprises positioning a taper hob, having a plurality of side cutting edges arranged in a thread which in an axial plane is of constant pitch measured on a cone surface of the hob, and having corresponding side cutting edges of continuously increasing pressure angle from the large to the small end of the hob, so that said hob extends diagonally of the face of a tapered gear blank with the cutting edges of smaller pressure angle operating at the outside of the toothed portion of the blank and the cutting edges of larger pressure angle operating at the inside of the toothed portion of the blank, and rotating the hob and blank continuously in engagement while simultaneously producing a relative rolling motion between the hob and blank.

18. The method of cutting a tapered gear which comprises positioning a taper hob, having a plurality of helically arranged cutting teeth which increase in height from the small to the large end of the hob and which are arranged in a thread which in an axial plane is of constant pitch measured on the pitch surface of the hob, said teeth having said cutting edges which are of continuously increasing pressure angle from the large to the small end of the hob, so that said hob extends diagonally of the face of a tapered gear blank with the cutting edges of smaller pressure angle operating at the outside of the toothed portion of the blank and the cutting edges of larger pressure angle operating at the inside of the toothed portion of the blank and rotating the hob and blank continuously in engagement while simultaneously producing a relative rolling motion between the hob and blank.

ERNEST C. HEAD.